UNITED STATES PATENT OFFICE.

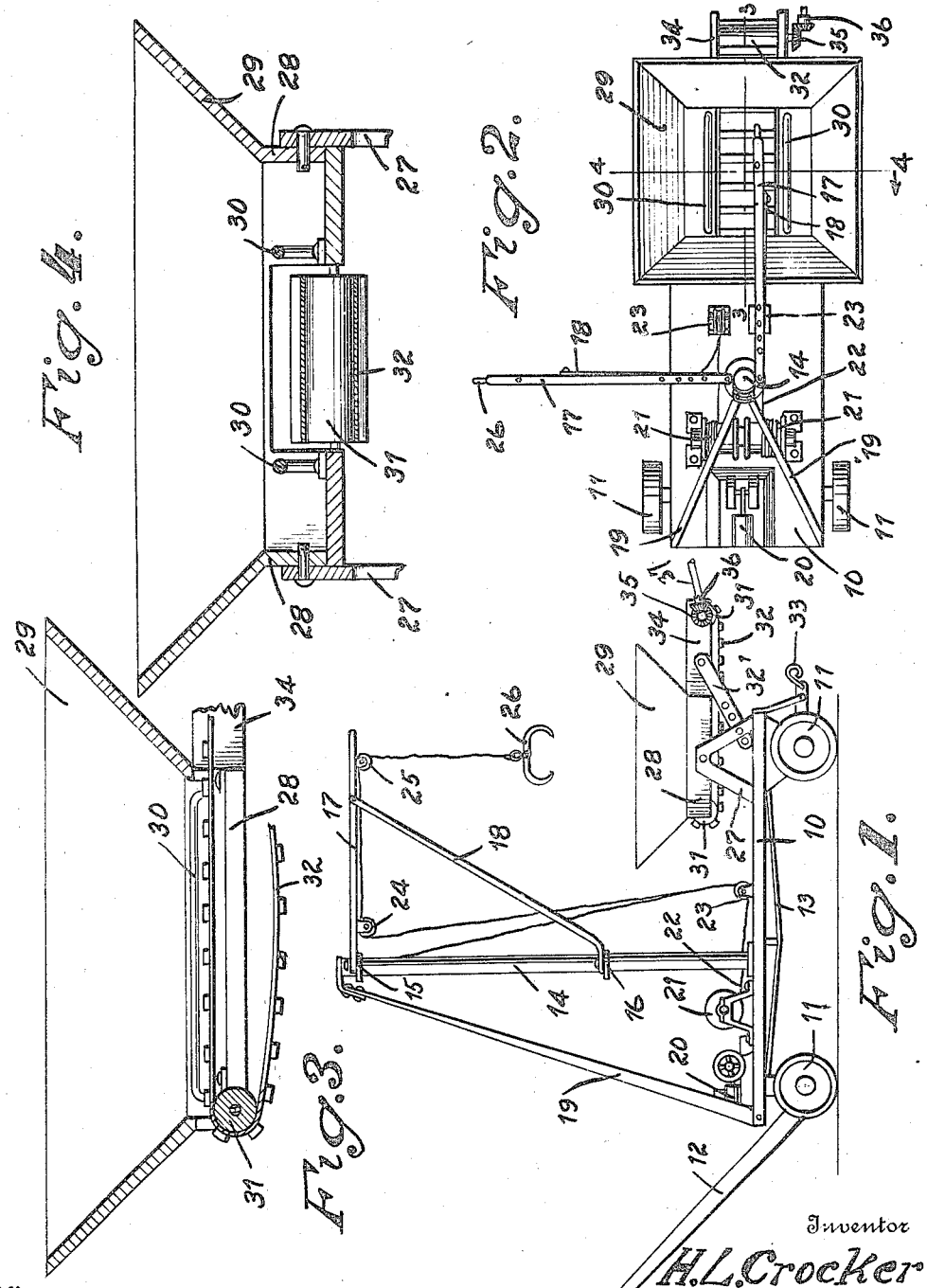

HERBERT L. CROCKER, OF JETMORE, KANSAS.

GRAIN PITCHER AND FEEDER.

1,193,494.  Specification of Letters Patent.  Patented Aug. 1, 1916.

Application filed August 12, 1913.  Serial No. 784,459.

*To all whom it may concern:*

Be it known that I, HERBERT L. CROKER, a citizen of the United States, residing at Jetmore, in the county of Hodgeman, State of Kansas, have invented certain new and useful Improvements in Grain Pitchers and Feeders; and I do hereby declare the following to be a full, clear, and exact description of the invention, such as will enable others skilled in the art to which it appertains to make and use the same.

This invention relates to improvements in feeding devices for thrashing machines.

The principal object of the invention is to provide a device for feeding the grain to be threshed to a threshing machine which requires a minimum amount of labor and time.

Another object of the invention resides in the provision of novel means for conveying the grain from the stack to the feeder, and in the peculiar construction and arrangement of feeder.

Other objects and advantages will be apparent from the following description when taken in connection with the accompanying drawings.

In the drawings: Figure 1 is a side elevation of the invention. Fig. 2 is a top plan view. Fig. 3 is a slightly enlarged longitudinal sectional view on the line 3—3 of Fig. 2. Fig. 4 is a vertical transverse sectional view on the line 4—4 of Fig. 2.

Referring particularly to the accompanying drawings, 10 represents a platform which is supported by the wheels 11, a suitable draft tongue 12 being provided so that the device can be moved from place to place. Beneath the platform is a suitable truss brace 13 for supporting the platform under the strain incident to the operation of the device. Mounted on the platform is a suitable mast 14 which carries the upper and lower flanged collars 15 and 16, to the upper of which are pivoted the booms or arms 17 and to the latter of which are pivotally connected supporting brace arms 18, the upper ends of said arms being connected to the said booms near their outer ends. The mast is suitably braced by means of the bars 19 which extend from the top of said mast down to the forward corners of the platform. Mounted on the platform adjacent the braces 19 is an engine 20, preferably of the explosive type, this engine being arranged to drive the winding drums 21 suitably mounted on the platform to the rear of the engine. Wound on the drums are the cables 22, these cables passing rearwardly and then upwardly around the pulleys 23 mounted on the platform and over the inner and outer pulleys 24 and 25 carried by the booms 17. The other end of each of the cables 22 depends from the outer end of the boom and carries a suitable hay fork or grapple 26.

Mounted on the rear of the platform is a suitable elevated supporting structure 27, in the upper end of which is pivotally mounted a swinging frame 28. This frame carries a hopper 29 in the bottom of which are arranged the longitudinal bars 30 for supporting the grain which is delivered into the hopper from the grapple 26.

Mounted near each end of the frame 28 is a belt roller 31, and trained around these rollers is a conveyer belt 32, the forward portion of said belt passing through the hopper and between the bars 30. Pivotally carried by the outer end portions of the frame 28 are the supporting bars or links 32', these links being adjustably connected to the supporting frame 27 so that the frame 28 can be swung on its pivot and held in various adjusted positions according to the position and height of the threshing machine with which the device is used. On the rear of the platform is carried a coupling 33 which is so arranged as to be connected to the threshing machine to hold the feeding device in proper position with respect thereto.

The frame 28 extends beyond the rear end of the hopper 29, and carries the side guard plates 34 which prevent the grain from falling off the conveyer belt as the material is fed to the threshing machine. On the forward roller 31 is secured a beveled pinion 33 which meshes with a similar pinion 36 carried on the rear end of a shaft 37. This shaft is driven from a part of the threshing machine not shown.

In the operation of the device, after the coupling 33 has been connected to the threshing machine and the end of the conveyer belt properly positioned at the receiving end of the threshing machine, one of the booms 17 is swung around to the stack of grain and the grapple lowered and loaded. It will of course be understood that the engine 20 is in the meantime running, but when the boom is swung around, the clutch, which is not shown, is released so that the grapple can drop. When the grapple is loaded, the clutch is thrown in so that the cable carried by the boom will be wound to raise the grapple and its load of grain. The construction of the drum, the clutches and the driving connections from the engine are all old and well-known expedients, as will be readily understood. The boom is swung around until the grapple is over the hopper, after which the grapple is lowered and the load dumped into the hopper. In the meantime the other boom can be swung around and be loaded while the first grapple is being unloaded. Thus one grapple can be loaded at the same time that the other is being unloaded.

While I have shown two booms on the mast, it will be understood that I may mount only a single boom, according to the desires of the user and the conditions of the work.

Particular attention is called to the bars 30, said bars supporting the grain delivered from the grapple 26 so that no great weight will be supported by the belt which might tend to impede or stop the movement thereof. The grain is gradually drawn from the bottom of the pile within the hopper between the bars 30.

What is claimed is:

A feeding device for a threshing machine including a suitably supported hopper, an endless conveyer belt mounted in the lower portion of the hopper, and longitudinally extending and elevated bars mounted in the bottom of the hopper and opposite sides of the conveyer belt for supporting the greater part of the weight of the grain from resting on the belt.

In testimony whereof, I affix my signature, in the presence of two witnesses.

HERBERT L. CROCKER.

Witnesses:
WILLIAM J. GILBERT,
OTTO RUMFORD.